Patented Dec. 12, 1950

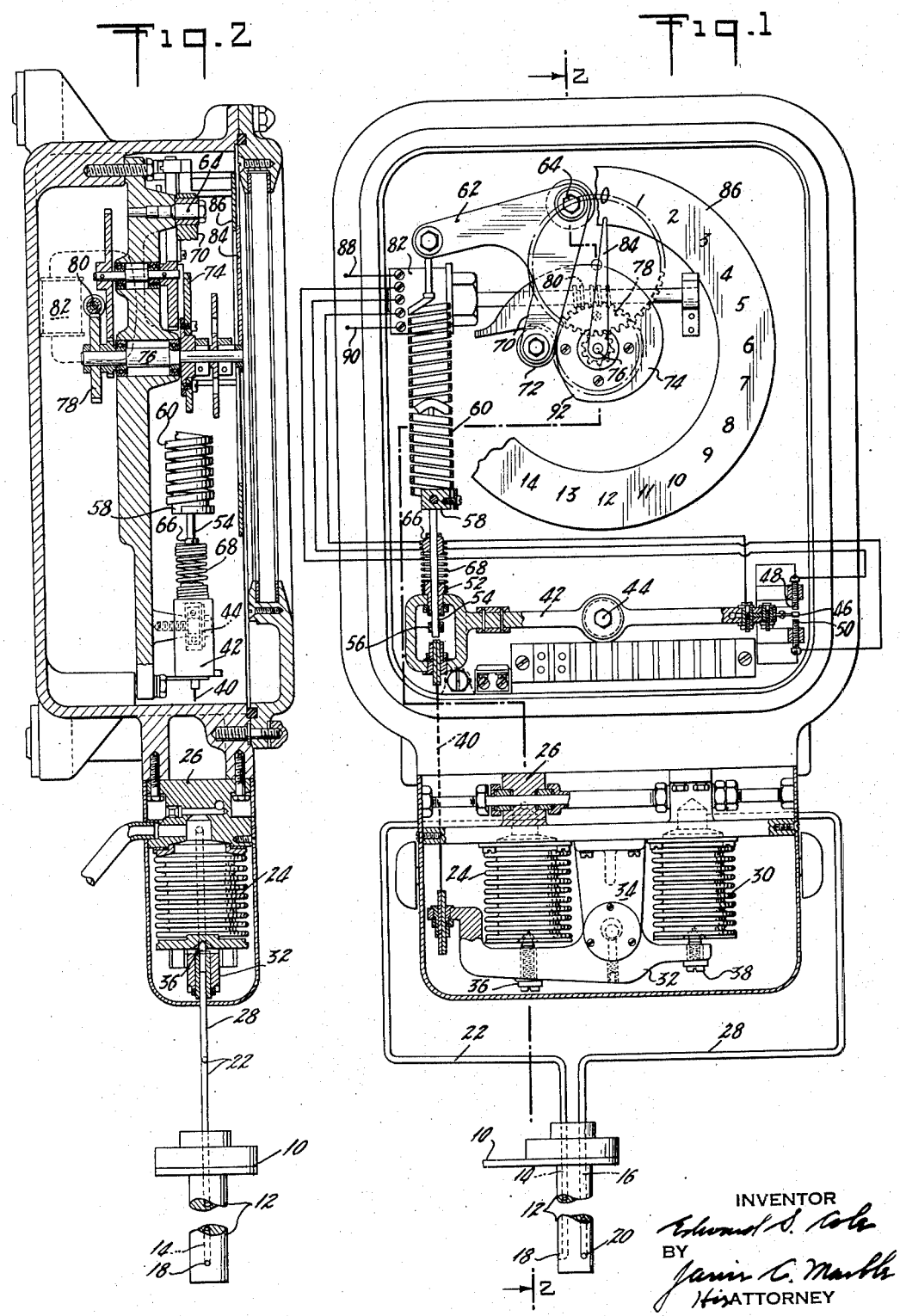

2,533,998

UNITED STATES PATENT OFFICE 2,533,998

SHIP'S LOG

Edward S. Cole, Upper Montclair, N. J., assignor to Pitometer Log Corporation, New York, N. Y., a corporation of New York Application December 16, 1946, Serial No. 716,451

8 Claims. (Cl. 73—182)

My invention relates to measuring instruments, and by way of example will be described in connection with a device for measuring the relative velocity of liquid, such as a log for measuring the speed of a ship relative to the water, or a flow meter for measuring the velocity of the flow of liquid through a conduit.

One of the objects of my invention is the provision of such an instrument which is accurate throughout its entire range, particularly at low values, such as low speeds or velocities, and one in which the calibrations of the dial may be uniform throughout the entire range.

Further objects and advantages of my invention will be apparent from the following description considered in connection with the accompanying drawings which form a part of this specification and of which:

Fig. 1 is a front view, partially in section, of a preferred embodiment of a device in accordance with the present invention; and Fig. 2 is a cross-sectional view taken on the line 2—2 of Fig. 1.

Referring to the drawings, my invention is illustrated as embodied in a ship's log. Reference character 10 designates a section of the hull of a ship through which extends a rod 12 formed with bores 14 and 16. Bore 14 terminates in what is known as a dynamic orifice 18 which faces towards the bow of the ship, while the bore 16 terminates in a static orifice 20 facing at 90° from the dynamic orifice.

A conduit 22 connects bore 14 with the interior of an axial expandible bellows 24, the upper end of which is rigidly secured to a frame 26. A similar conduit 28 connects the upper end of bore 16 with a similar bellows 30 likewise supported from the frame 26.

A lever arm 32 is pivotally mounted on a bracket 34 extending downwardly from the frame 26 between the bellows 24 and 30. This arm is provided with setscrews 36 and 38 having pointed upper ends which engage notched recesses formed in the lower movable heads of bellows 24 and 30, respectively. A wire or cable 40 is anchored at its lower end to the left-hand end of arm 32 and at its upper end to the left-hand end of a balance lever 42 which is pivotally mounted at 44 to the frame of the device. The opposite end of lever 42 carries an electric contact 46 which is movable between stationary contacts 48 and 50.

Secured to the left-hand end of the lever 42, preferably in alignment with the wire 40, is a bushing 52 through which slidably extends a rod 54. This rod is provided with a stop 56 for limiting the upward movement of the rod through the bushing 52. The upper end of the rod is secured to a block 58 which forms the lower anchorage for a relatively stiff spring 60. This spring is preferably reversely wound in order to automatically compensate for the effect of temperature variations on the spring, as is well known. The upper end of the spring is pivotally connected to an arm 62 of a bellcrank lever which is pivoted to the frame at 64.

A collar 66 is fixed to an intermediate point on rod 54 and a relatively light spring 68 is anchored between collar 66 and the bushing 52 on arm 42. The collar 66 may be adjusted along the rod 54 to adjust the tension of spring 68.

The other arm 70 of the bellcrank lever carries a roller 72 which constitutes a follower for a cam 74 which is fixed to a shaft 76 journalled in the frame. This shaft carries a worm gear 78 which meshes with a worm 80 on the shaft of a reversible motor 82. Also fixed to the shaft 76 is a pointer 84 which cooperates with a stationary dial 86 calibrated in knots or other desired units of speed.

The motor 82 is supplied with electric current through the leads 88 and 90. Three additional conductors lead from the motor to the contacts 46, 48 and 50, respectively, the arrangement being such that when the circuit is completed through contacts 46 and 48 the motor rotates in one direction, when completed through the contacts 46 and 50 it rotates in the other direction, and when both circuits are open, as shown in the drawing, the motor is stationary.

As is well known, the change in the pressure difference produced by the dynamic and static orifices is proportionate to the square of the change in speed of the ship through the water. Consequently, the force applied to the arm 32, and transferred through the cable 40 to the contact arm 42 is proportionate to the square of the speed. In order to balance the arm 42, the force applied thereto through the springs 60 and 68 must of course be equal to the force in the opposite direction applied through the cable 40. The force applied through the springs is obtained by pivoting the bellcrank lever in a clockwise direction by rotating the cam 74 in a clockwise direction. In order that the rotation of the cam shall be directly proportionate to the speed of the ship, it is necessary that the rotation be proportionate to the square root of the increase in spring tension produced thereby. Consequently, the rotation of the cam must be proportionate to the square root of the rise of the cam, or, in other words, the rise of the cam must be proportionate to the square of the rotation. Such a relationship is obtained if the cam is made in the form of a logarithmic spiral.

However, if the same spiral is employed throughout the entire cam surface, the rise through the lower range is so slight that the instrument is objectionably inaccurate in this range, which through experience has been found to be from zero to four knots.

In order to overcome this objection, while still making possible the use of a scale calibrated uniformly throughout the entire range, I provide a cam having lower and upper sections. As will be seen from Fig. 1 there is an abrupt change in the rate of rise of the cam at the point 92, the rise being substantially steeper below this point than immediately above it, although further up on the upper section the rise becomes much steeper. In other words, if the spiral constituting the upper section of the cam were continued from the point 92 to the low point of the cam, the rise from the low point to point 92 would be extremely slight, and in accordance with my invention, this almost flat portion is replaced by a spiral having a substantially greater rise. Both sections of the cam are logarithmic spirals, the lower section up to the point 92 being designed for use in connection with the weaker spring 68, while the other section is designed for use with the stronger spring 60. The manner in which the two sections of the cam cooperate with the two springs to give accurate readings throughout the entire range will be apparent from the following description of the operation of the device as a whole.

Assuming first that the ship is under no headway, the pressure produced by the dynamic and static orifices will be the same and hence the turning moments applied to the lever 32 by the bellows 24 and 30 will be equal and opposite and hence no force will be transmitted from the lever through the cable 40. Consequently, the contact lever 42 will be in balance if no force is applied thereto by the springs. Therefore, the mechanism is so adjusted that with the cam follower 72 at the lowest point on the cam the springs will be under zero tension.

Assuming next, that the ship is travelling at a relatively slow speed of two knots, the water forced into the dynamic orifice 18 will cause the bellows 24 to produce a force which is proportionate to the square of this speed. Inasmuch as no change occurs in the force produced by the static orifice 20, the lever 32 will be pivoted in a counterclockwise direction by a net turning moment proportional to the square of the speed. This force is transmitted through cable 40 and causes the lever 42 to pivot in a counterclockwise direction so as to close the circuit of the motor 82 through the contacts 46 and 48. This causes the motor to rotate in a direction such that the cam 74 is turned in a clockwise direction, the rise of the cam thus causing the bellcrank lever to pivot in a clockwise direction. Inasmuch as the spring 68 is much weaker than the spring 60, this movement of the bellcrank lever elongates the weaker spring 68, thus placing it under tension and applying an upwardly directed force to the contact lever 42. The motor continues to operate until the force thus applied by the spring to the contact lever balances the force applied to this lever by the cable 40, whereupon the lever is balanced and the contacts are opened. The rotation of the cam necessary to accomplish this causes the pointer 84 to rotate relative to the dial 86 and thus to indicate the speed of the ship directly on the dial.

Assuming now that the speed of the ship increases to above four knots, the contacts 46 and 48 will again be closed and the cam 74 rotated further in a clockwise direction. This at first increases the elongation of the spring 68 until the speed reaches four knots, at which value the spring 68 has been elongated sufficiently to cause the abutment 56 on the rod 54 to strike the lower end of the bushing 52. At this point the cam follower 72 is at the point 92 on the cam and further elongation of the spring 68 is prevented. Further rotation of the cam as the follower travels over the less steep portion of the cam contour causes elongation of the spring 60, and it continues until the lever 42 is again in balance so as to open the contacts and start the motor.

A decrease in the speed of the ship decreases the force applied by the bellows 24 and hence the force applied to the contact lever 42 by the spring 60 predominates and causes the lever to pivot in a clockwise direction, thus closing the circuit of the motor through the contacts 46 and 50 which causes the motor to rotate in the opposite direction, so as to turn the cam counterclockwise. This reduces the tension in the spring until the contact lever 42 is again in balance. If the speed drops below four knots, the abutment 56 is able to move away from the line of the bushing 52, thus permitting the spring 68 to again come into action.

It will thus be seen that by the use of springs of different strength in combination with a cam having an abrupt change in rise, the instrument is accurate throughout its entire range. Obviously, if desired, more than two springs could be employed, in which case the cam would have as many different sections as the number of springs used.

While I have shown and described for purposes of illustration one more or less specific embodiment of my invention as applied to a ship's log, it is to be understood that the scope of my invention is not to be limited to the structural details disclosed nor to the application of the invention to a ship's log, but is to be determined from the scope of the appended claims.

What is claimed is:

1. In a device of the class described, a balance lever, means for applying a turning moment to said lever, a cam having a contour divided into a plurality of sections, successive sections having progressively smaller rates of rise, a follower for said cam, spring means between said follower and said lever arranged to be stressed by displacement of the follower to apply a balancing moment to the lever, said spring means including a plurality of springs equal in number to the number of sections of said cam, said springs being connected in series and of different strengths, means for limiting elongation of all but the strongest of said springs, regulating means operatively connecting said lever with said cam and responsive to movement of the lever for causing said spring means to balance the turning moment applied to the lever by the first mentioned means, and means actuated by said cam indicative of the value of said turning moment.

2. In a device of the class described, a balance lever, means for applying a turning moment to said lever, a cam having a contour divided into a plurality of sections, each section being a logarithmic spiral and successive sections having progressively smaller rates of rise, a follower for said cam, spring means between said follower and said lever arranged to be stressed by displacement of the follower to apply a balancing moment to said lever proportionate to the square of the angular movement of said cam, said spring means including a plurality of springs equal in number to the number of sections of the cam, said springs being connected in series and of different strengths, means for limiting elongation of all but the strongest of said springs so that the limit of elongation of each limited spring is reached when said follower is at the upper end of the corresponding section of said cam, regulating means operatively connecting said lever with said cam and responsive to movement of the lever for causing said spring means to balance the turning moment applied to the lever by the first mentioned means, and means actuated by said cam indicative of the value of said turning moment.

3. In a device of the class described, a balance lever, means for applying a turning moment to said lever, a cam having a contour divided into two sections, one of which has a steeper rate of rise than the minimum rate of rise of the other, a follower for said cam, spring means between said follower and said lever arranged to be stressed by displacement of the follower to apply a balancing moment to the lever, said spring means including a relatively weak spring in series with a relatively strong spring, means for limiting elongation of said weak spring, means responsive to an unbalance of said lever for rotating said cam in the proper direction to change the stress in said spring means for restoring the balance, and means actuated by said cam indicative of the value of said turning moment.

4. In a device of the class described, a balance lever means for applying a turning moment to said lever, a cam having a contour divided into two sections, one of which has a steeper rate of rise than the minimum rate of rise of the other, a follower for said cam, spring means between said follower and said lever arranged to be stressed by displacement of the follower to apply a balancing moment to the lever, said spring means including a relatively weak spring in series with a relatively strong spring, means for limiting elongation of said weak spring, a pair of fixed spaced electric contacts, a contact movable by said balance lever between said fixed contact, a reversible motor for rotating said cam, electrical connections between said contacts and said motor whereby an unbalance of said lever causes the closing of a circuit through the movable contact and either of said fixed contacts which causes said motor to rotate the cam in the proper direction to change the stress in said spring means for restoring the balance and opening said circuit, and means actuated by said cam indicative of the value of said turning moment.

5. In a ship's log, a balance lever, means for applying a turning moment to said lever proportionate to the square of the speed of the ship relative to the water, a cam having a contour divided into a plurality of sections, successive sections having progressively smaller rates of rise, a follower for said cam, spring means between said follower and said lever arranged to be stressed by displacement of said follower to apply a balancing moment to the lever, regulating means operatively connecting said lever with said cam and responsive to movement of said spring means to balance the turning movement applied to the lever by the first mentioned means, said spring means including a plurality of springs equal in number to the number of sections of said cam, said springs being connected in series and of different strengths, means for limiting the elongation of all but the strongest of said springs, a dial calibrated in units of speed, and a pointer displaceable relative to said dial in proportion to the angular movement of said cam.

6. In a ship's log, a balance lever, means for applying a turning moment to said lever proportionate to the square of the speed of the ship relative to the water, a cam having a contour divided into two sections, one of which has a steeper rate of rise than the minimum rate of rise of the other, a follower for said cam, spring means between said follower and said lever arranged to be stressed by displacement of said follower to apply a balancing moment to the lever, regulating means operatively connecting said lever with said cam and responsive to movement of said spring means to balance the turning movement applied to the lever by the first mentioned means, said spring means including a relatively weak spring in series with a relatively strong spring, means for limiting the elongation of said weak spring, a dial calibrated in units of speed, and a pointer displaceable relative to said dial in proportion to the angular movement of said cam.

7. In a ship's log, a balance lever, means for applying a turning moment to said lever proportionate to the square of the speed of the ship relative to the water, a cam having a contour divided into a lower section and an upper section, both sections being logarithmic spirals, the lower section having a steeper rate of rise than the lower portion of the upper section, a follower for said cam, spring means between said follower and said lever arranged to be stressed by displacement of the follower to apply a balancing moment to said lever proportionate to the square of the angular movement of said cam, regulating means operatively connecting said lever with said cam and responsive to movement of said spring means to balance the turning movement applied to the lever by the first mentioned means, said spring means including a relatively wear spring in series with a relatively strong spring, means for limiting elongation of the weak spring so that the limit of elongation is reached when said follower is at the upper end of said lower section of the cam contour, a dial calibrated uniformly in units of speed, and a pointer displaceable relative to said dial in proportion to the angular movement of said cam.

8. In a ship's log, a balance lever, means for applying a turning movement to said lever proportionate to the square of the speed of the ship relative to the water, a cam having a contour divided into a lower section and an upper section, both sections being logarithmic spirals, the lower section having a steeper rate of rise than the lower portion of the upper section, a follower for said cam, spring means between said follower and said lever arranged to be stressed by displacement of the follower to apply a balancing moment to said lever proportionate to the square of the angular movement of said cam, said spring means including a relatively weak spring in series with a relatively strong spring, means for limiting elongation of the weak spring so that the limit of elongation is reached when said follower is at the upper end of said lower section of the cam contour, means responsive to an unbalance of said lever for rotating said cam in the proper direction to change the stress in said spring means for restoring the balance, a dial calibrated in units of speed, and a pointer movable relative to said dial in proportion to the rotation of said cam.

EDWARD S. COLE.

REFERENCES CITED

The following references are of record in the file of this patent:

UNITED STATES PATENTS

| Number | Name | Date |
|---|---|---|
| 1,638,102 | Roucka | Aug. 9, 1927 |
| 1,968,539 | Rydberg | July 31, 1934 |
| 2,421,222 | Schaevitz | May 27, 1947 |

FOREIGN PATENTS

| Number | Country | Date |
|---|---|---|
| 302,800 | Italy | Nov. 8, 1932 |